United States Patent [19]

Guillerot et al.

[11] Patent Number: 5,081,459
[45] Date of Patent: Jan. 14, 1992

[54] DOPPLER RADAR FOR THE DETECTION AND LOCALIZING OF HELICOPTERS

[75] Inventors: Jean-Claude Guillerot, Versailles; Claude Chanot, Clamart; Thierry Girou, Paris; Patrick de Grancey, Emerainville, all of France

[73] Assignee: Thomson-CSF, Puteaux, France

[21] Appl. No.: 614,135

[22] Filed: Nov. 16, 1990

[30] Foreign Application Priority Data

Nov. 17, 1989 [FR] France .................... 89 15101

[51] Int. Cl.⁵ .............................................. G01S 13/52
[52] U.S. Cl. ........................................ 342/90; 342/192
[58] Field of Search ................................ 342/192, 90

[56] References Cited

U.S. PATENT DOCUMENTS

| | | | |
|---|---|---|---|
| 4,038,656 | 7/1977 | Webb, Jr. et al. | 342/192 |
| 4,275,396 | 6/1981 | Jacomini | 342/192 X |
| 4,308,535 | 12/1981 | Guillerot et al. | 342/160 X |
| 4,346,382 | 8/1982 | Bosc et al. | 342/192 |
| 4,389,647 | 6/1983 | Fanuele et al. | 342/192 X |
| 4,573,052 | 2/1986 | Guillerot et al. | 342/160 X |

FOREIGN PATENT DOCUMENTS 3130966  2/1985  Fed. Rep. of Germany ...... 342/192
2463938  2/1981  France .

*Primary Examiner*—Gilberto Barron, Jr.
*Attorney, Agent, or Firm*—Pollock, VandeSande & Priddy

[57] ABSTRACT

This Doppler radar for the detection and localization of helicopters through blade flashes works in a band located between 300 MHz and 20 GHz and identifies the blade flashes by the width of their frequency spectrum and their duration. It uses, at reception, a multilobe antenna associated with several parallel signal processing chains specialized in the detection of helicopters, enabling detection over a widened zone as well as precise localization. Each chain has a phase amplitude detector PAD (10, 10') followed by a Doppler filter MTI (20, 20') selecting the wide frequency spectrum, a module computing circuit (30, 30'), a contrast circuit (40, 40') eliminating excessively long echoes, a threshold circuit (50, 50') and a false alarm reduction circuit FAR (60, 60') eliminating excessively short echoes. The chains lead to a relative bearing computation circuit (100) performing angle measurements when this is possible.

3 Claims, 3 Drawing Sheets

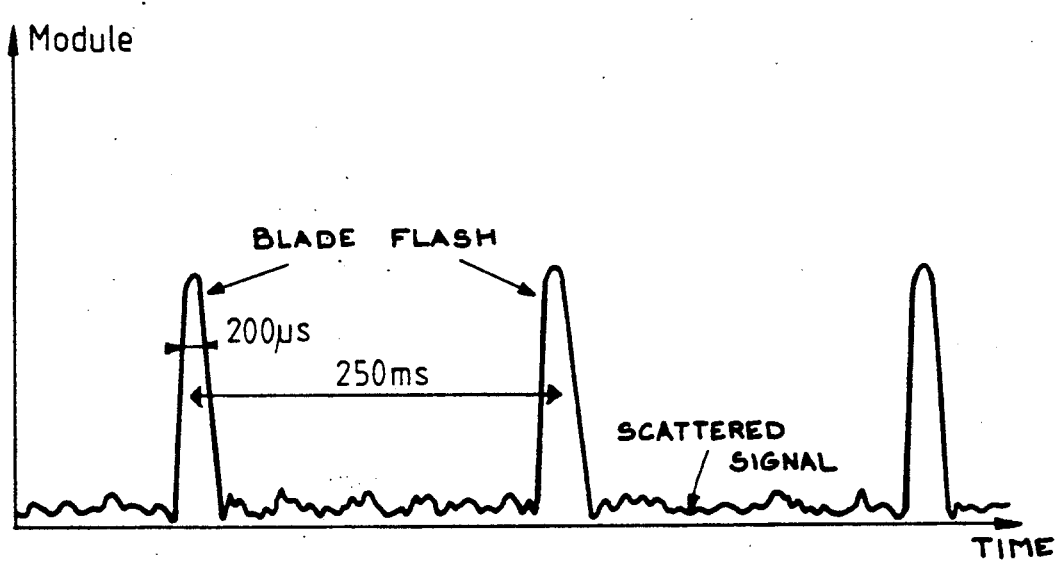
FIG_1
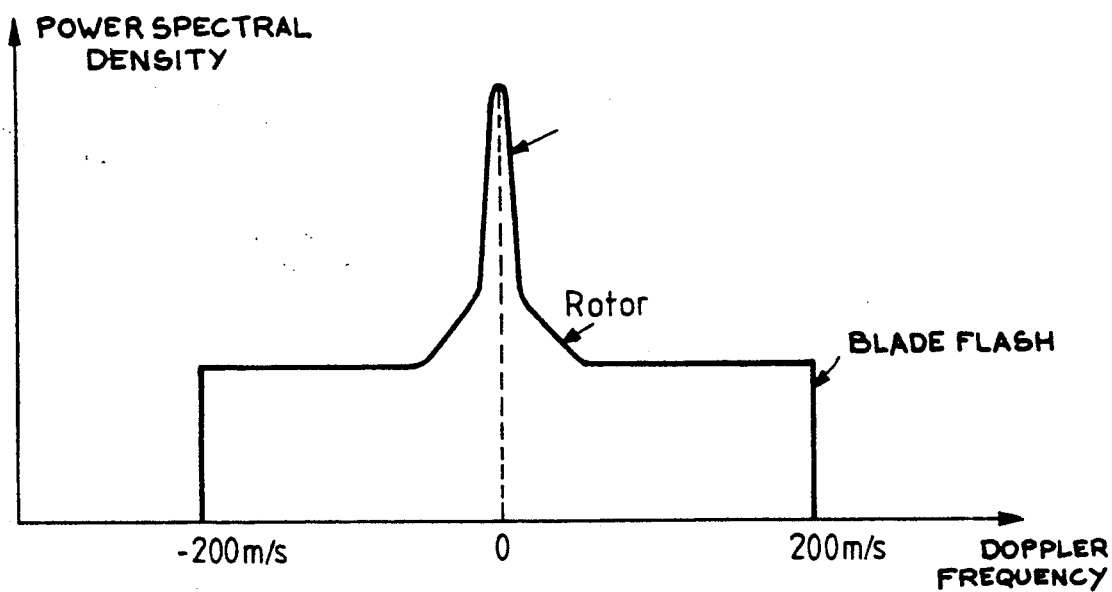
FIG_2

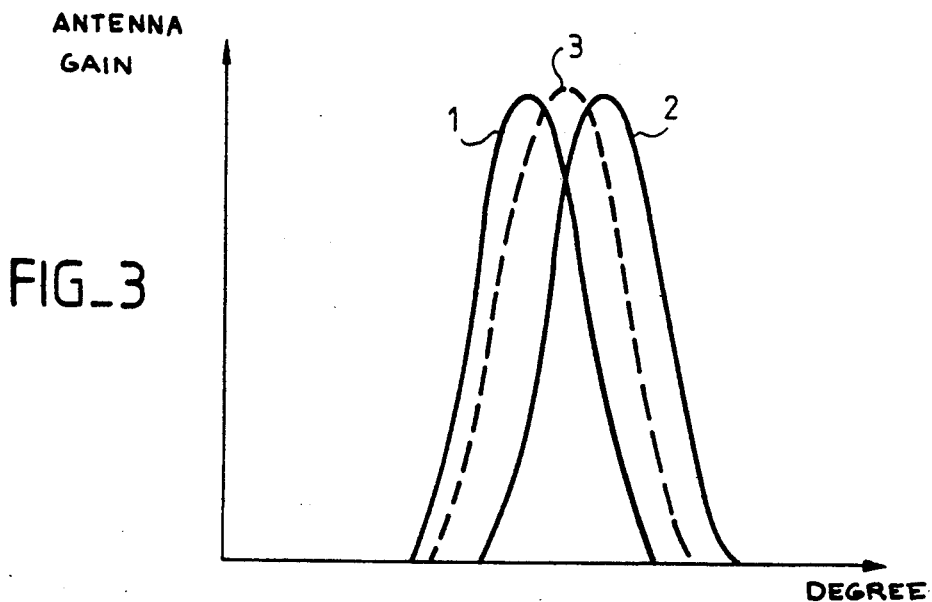
FIG_3
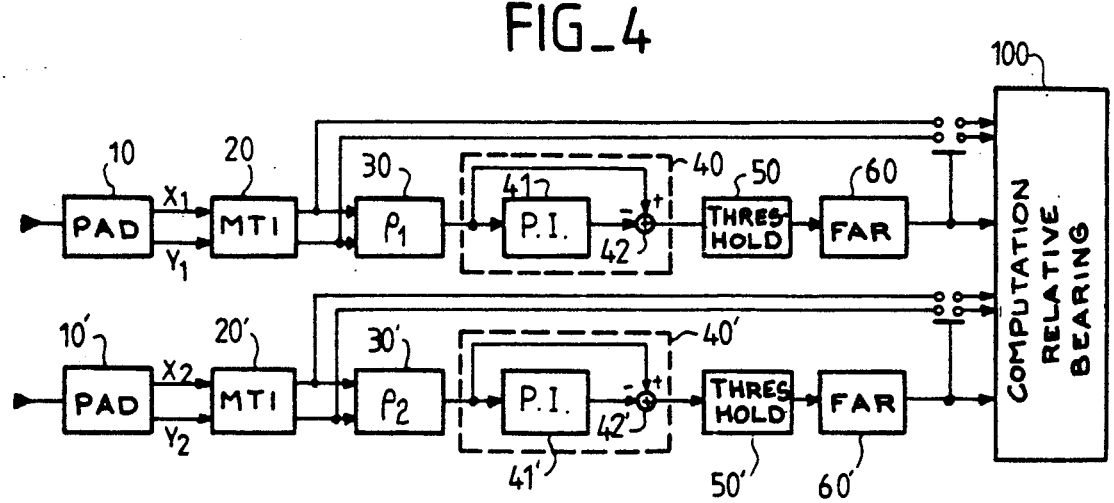
FIG_4

FIG_5
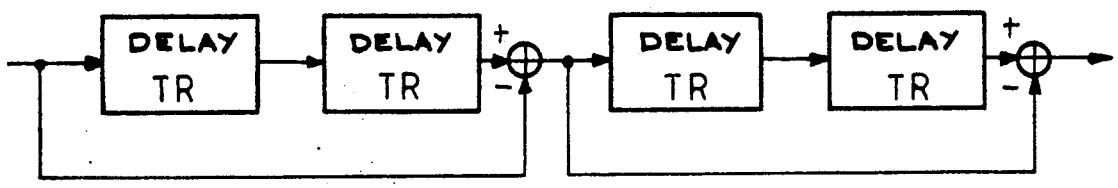
FIG_6
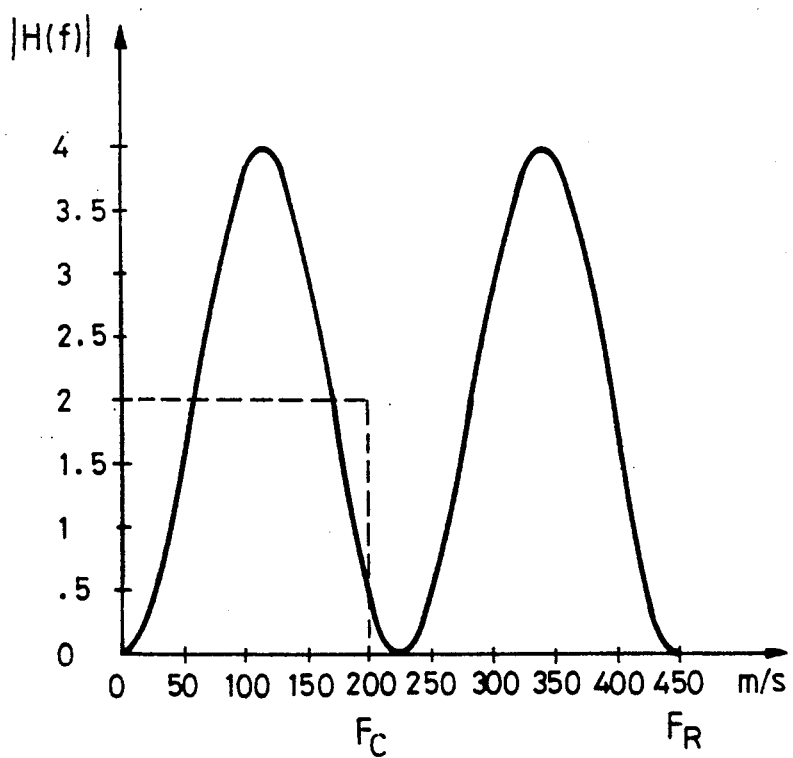

DOPPLER RADAR FOR THE DETECTION AND LOCALIZING OF HELICOPTERS

BACKGROUND OF THE INVENTION

1. Field of the Invention

The present invention concerns the detection and localization of hovering helicopters, where this detection has to be done in a short period of time starting from the instant when the helicopters come into view from behind a screen of vegetation.

2. Description of the Prior Art

It is known that a helicopter ca be identified by the echos from its rotor, which are called blade flashes. These echos have certain specific characteristics, notably a wide frequency spectrum due to the Doppler effect on the rotating blades of the rotor and a modulation of amplitude due to the periodic passing of the blades through the perpendicular to the radar-helicopter axis. These characteristics may be exploited to distinguish the helicopters from other targets.

There is, for example, a radar known from the U.S. Pat. No. 4,346,382, which works at low frequency in the 160 MHz band, where the blade flashes intersect each other. In this type of radar, for each distance window, the module of the echo signal is extracted after a synchronous demodulation in phase and in quadrature and a Doppler filtering that eliminates the echo components due to fixed or slow-moving targets, and said module is subjected to a high-pass filtering to extract the amplitude modulation therefrom and trigger a threshold circuit.

This type of radar has the drawback of having a bulky antenna given its low frequency of operation, and of consequently having little mobility.

The present invention is aimed at overcoming this drawback and, more generally, at enabling the detection and localization of helicopters by means of radars working in higher frequency bands that range from 300 MHz to 20 GHz.

SUMMARY OF THE INVENTION

An object of the invention is a Doppler radar for the detection and localization of helicopters through the blade flash echos, including means for the selection of the echos as a function of the width of their frequency spectrum, selecting the echos having a certain spectrum width, and means for selecting the echos as a function of their duration, selecting the echos that have a duration in the range of that of the blade flashes.

The Doppler radar is a scanning radar that generates at least two interrogation pulses in the duration of one blade flash. The means of selection as a function of the duration include means for eliminating excessively long echos, said means eliminating echos with a duration that corresponds to the time taken for the major transmission-reception antenna lobe to pass through a fixed direction, and means for eliminating excessively short echos, said means eliminating echos with a duration that does not go beyond a period of recurrence of the interrogation pulse.

Advantageously, the Doppler radar has an ambiguous speed of the order of 450 m/s and means for the selection of the echoes as a function of the width of the frequency spectrum formed by one or more cascade-mounted filters having a zero at the zero frequency to eliminate the fixed or slow-moving echos and a zero at the half frequency of recurrence of the interrogation pulses.

BRIEF DESCRIPTION OF THE DRAWINGS

Other characteristics and advantages of the invention will emerge from the following description of an embodiment, given by way of an example:

This description will be made with reference to the appended drawings, wherein:

FIG. 1 represents the module after elimination of the continuous component, of the typical temporal signature of a hovering helicopter;

FIG. 2 represents the typical frequency signature of a hovering helicopter;

FIG. 3 represents the radiation patterns of the transmission and reception antennas of a radar according to the invention;

FIG. 4 is a block diagram of a processing chain for the reception signal of a radar according to the invention;

FIG. 5 is a block diagram of a Doppler filter used in the reception signal processing chain according to FIG. 4, and FIG. 6 represents the transfer function of the Doppler filter, the diagram of which is shown in FIG. 5.

DETAILED DESCRIPTION OF THE INVENTION

In the 300 MHz to 10 GHz frequency band, the electromagnetic signature of a helicopter is formed by the superimposition of very different characteristic signals:

the echo on the cell which, for a hovering helicopter, is identical to a fixed echo unaffected by a Doppler shift. Since the radar has to be protected against the echos related to the environment (reflections on the ground, buildings, birds and insects), this component of the signature is eliminated;

the reflections on the rotor which produce a very characteristic temporal signature formed by high intensity but short-lived blade flashes which occur whenever a blade passe through the perpendicular to the radar-helicopter axis.

The duration of a blade flash $\Delta\tau$ taken at 3 dB below the maximum is given by the following formula:

$$\Delta\tau = \frac{1.39}{\pi} \cdot \frac{\lambda}{L\Omega}$$

with $\Delta\tau$: width of the 3 dB flash in seconds
$\lambda$: transmission wavelength of the radar in meters
$L$: Length of the blade in meters
$\Omega$: rotation speed of the rotor in radians per second.

Typically, in S band ($\lambda = 10$ cm), this width $\Delta\tau$ is equal to about 200 µs approximately.

The frequency of appearance of the blade flashes is a function solely of the characteristics of the rotor (speed of rotation of the blades, number of blades, parity of the number of blades etc.). This frequency typically ranges between 20 and 40 Hz and may go below 10 Hz for some rare types of helicopters. In the even relatively favorable case where the frequency of the flashes is 40 Hz, the period between two 250 ms flashes is considerably greater than the duration of the flash (200 µs in S band).

Between the blade flashes, there is also a permanent low-power signal, called a scattered signal, which is also related to the reflections on the rotor.

FIG. 1 represents the module, in the course of time, of the signal backscattered by a hovering helicopter, in response to the interrogation pulses of a radar working in S band ($\lambda = 10$ cm) when the continuous component due to the cell and to the stray fixed echos has been eliminated. This figure shows a sequence of pulses due to the blade flashes emerging from a noise signal due to the scattered signal.

FIG. 2 represents the power spectrum, as a function of the Doppler frequency of the signal backscattered by a hovering helicopter, such as can be measured in a short period. The figure shows a spectral line at the zero frequency due to the cell and a wide spectrum of blade flashes due to the rotor with an approximately constant density, between 0 and 200 m/s for an advancing blade and $-200$ m/s and 0 for a retreating blade, with a rise at the low frequencies due to the central part of the rotor. For a moving helicopter, this spectrum is shifted by the radial speed of the helicopter.

The transmission chain of the radar that shall be described shall not be given in detail because it is a conventional one, its elements being typical of a coherent pulse radar.

The transmission antenna illuminates the zone of space where a helicopter is expected to be found. It is rotating so as to be capable of providing for a watch on 360°, at a sufficiently fast rate of one rotation per second to renew the watches frequently and limit the reaction time. The constraint as regards being sure of seeing the target is that the time taken by the lobe of the transmission antenna to pass through a given direction is at least greater than the time between two consecutive blade flashes. This dictates a relatively wide lobe. Instead of a rotating transmission antenna, it is possible to consider having a fixed transmission antenna if the sector where the target is expected is limited in relative bearing.

The radar transmits a sequence of radar pulses at the same transmission frequency, at a recurrence rate that is fast enough for there to be at least two interrogation pulses during the period of one blade flash (which is equivalent to having an ambiguous speed of more than 400 m/s) and, at the same time, slow enough to prevent ambiguities in distance. In the case described, of a radar working in S band at a wavelength of 10 cm, this recurrence rate is of the order of 9 KHz, which represents one interrogation pulse every 110 $\mu$s while the width of a 3 dB blade flash is equal, typically, as we have seen earlier, to about 200 $\mu$s. Each interrogation pulse may or may not be modulated according to any compression code.

The head of the reception chain giving the video signal is also conventional. The signal delivered by the reception antenna is demodulated by the transmission carrier and, then, after possible transpositions into intermediate frequency, it is filtered by a filter matched with the transmitted pulse. It is then sampled with a constant pitch within the recurrence period. This pitch corresponds to the depth in distance of the resolution cell of the radar. Thus, for a given reception channel, in each distance window, we obtain the components in phase and quadrature of the pulse echos in base band.

To combine a high gain with a wider watching zone, a multilobe reception antenna is used. This multilobe antenna may possess, for example, as shown in FIG. 3, two reception lobes 1 and 2 which are offset in relative bearing, partially overlapping each other and covering the transmission lobe 3. These offset reception lobes enable a precise localization of a target by amplitude monopulse but also (and this is the advantage as compared with phase monopulse) they make it possible to have a longer listening period, even if it means not making angle measurements on the leading and trailing edges of the multilobe. Thus, we increase the chances of intercepting blade flashes by a rotating antenna, notably when the frequency of appearance of the flashes is low.

FIG. 4 is a block diagram of a reception signal processing chain, specializing in the identification of helicopters. This chain has two identical channels, one per reception lobe, ending in a relative bearing computation circuit 100.

At the head of each channel, it is possible to see a phase amplitude detector PAD, 10 and 10' respectively, which delivers the components in phase and quadrature, X1 and Y1, X2 and Y2 respectively, of the signal of a reception lobe, 1 and 2 respectively, after this signal has undergone a transposition into baseband and a filtering matched with the transmitted pulse, these components being sampled synchronously and corresponding to a same radar distance window.

The components in phase and quadrature delivered by the phase amplitude detector 10 and 10' respectively are applied to a Doppler filter called a moving target indication filter MTI, 20, 20' respectively which eliminates the fixed echos and the slow-moving strays to let through only the useful signals with wide frequency spectrum. This filter MTI 20, 20' respectively is matched with the spectrum of the blade flashes which extend, as we have seen previously, from $-200$ m/s to $+200$ m/s. It presents a zero at the zero frequency to get rid of the ground echos and a zero at half of the frequency of recurrence of the interrogation pulses which, taking into account the ambiguous Doppler speed of 450 m/s of the radar described, is located in a range which is above $+200$ m/S and below $-200$ m/s where there is no useful signal. A simple way of making a filter such as this consists in taking the difference between two separate samples of two recurrence periods TR of the interrogation pulses. It is then constituted by a cell formed by a delay circuit introducing, into the samples, a delay of two periods of recurrence TR of the interrogation pulses and a subtractor, the two inputs of which are connected to the output of the phase amplitude detector, one of which, namely the adding input, is connected by means of the delay circuit while the other, namely the subtracting circuit, is connected directly. To improve the rejection of the fixed echos, it is possible to set up a cascade mounting of at least two cells of this type as is the case in the Doppler filter MTI shown in FIG. 5. The response of a Doppler filter MTI such as this, with two cascade-mounted cells and with a pulse signal available in the form of a sequence of samples 00100 ... is then the sequence of samples 0010–20100. Its transfer function is shown in FIG. 6.

For the Doppler filter MTI 20, 20', it is possible to adopt a digital filter structure which is more complex with other weighting coefficients so as to obtain a more "square-shaped" transfer function. This Doppler filter MTI can also be replaced by a bank of three Doppler filters MTI, a first one having a transfer function with a pass band in the 10 to 200 m/S range for the advancing blades, a second one having a transfer function with a pass band in the $-200$ to $-10$ m/s range for the retreating blades, and a third filter having a transfer function of the type described earlier for helicopters with simultaneously advancing and retreating blades. The adoption of a three-filter bank such as this makes it possible to improve the signal-to-noise ratio of the blade flash echos.

The components in phase and in quadrature of the Doppler filter MTI 20, 20' are applied to a module computing circuit, 30, 30' respectively, which performs the operation:

$$\rho = \sqrt{x^2 + y^2}$$

To compute the module, other functions approaching linear, quadratic or logarithmic detection may also be used.

The instantaneous module delivered by the module computing circuit 30, 30' is then applied to a contrast circuit, 40, 40' respectively, eliminating echos that are too long to be blade flashes. This contrast circuit 40, 40' gets rid of the echos coming from moving targets other than helicopters, the modules of which vary as the transmission-reception antenna lobe, namely the duration of which corresponds to the time taken for the transmission-reception antenna lobe to pass through a fixed direction. To do this, it subtracts an estimated ambience value from the instantaneous module given by the module computing circuit 30, 30'. This estimated ambience value is the mean value of the module in a temporal window surrounding the sample to be tested over a period which is of the order of the time taken for the transmission antenna lobe to pass through a fixed direction. To this effect, it has a post-integration circuit PI, 41, 41' computing the ambience value on the basis of the module samples given by the module computing circuit 30, 30' and a subtractor circuit 42, 42', the inputs of which are connected to the module computing circuit 30, 30', one of these inputs, namely the adding input, being connected directly while the other input, namely the subtracting input, being connected by means of the post-integration circuit PI, 41, 41'.

The signal coming from the contrast circuit 40, 41' is applied to a threshold comparator 50, 50' respectively. When the threshold is crossed, there are echos present.

The threshold circuit 50, 50' is followed by a false alarm reduction circuit FAR 60, 60' respectively, which eliminates the echos that are too short to be blade flashes. This false alarm reduction circuit FAR 60, 60' applies a 2/2 criterion. When there are two successive detections of a presence of echos by the threshold comparator 50, 50', the criterion is verified and blade flashes are present in the channel considered. This criterion enables the elimination of the isolated stray pulse responses due, for example, to interference created by other radars working in the same band. Indeed, the shape of the pulse response (... 0010–20100 ...) of the Doppler filter MTI 20, 20' means that it converts the isolated pulse responses into sequences of isolated pulses which do not verify a 2/2 criterion. By contrast, a blade flash lasts two to three successive recurrences and is accepted by the criterion.

The pieces of information on a presence of blade flashes, available at output of the false alarm reduction circuits 60, 60', and the components in phase and in quadrature of the samples of reception signals at output of the Doppler filters 20, 20' on the two channels are transmitted to the relative bearing computation circuit 100.

When there is a piece of information on the presence of blade flashes simultaneously on both channels, the components available at output of the Doppler filters MTI 20, 20' are used in the relative bearing computation circuit 100 to construct an angle difference ratio giving the position of the helicopter in relation to the direction given by the point of intersection of the two reception lobes (1, 2 FIG. 3) at the corresponding instant. The angular difference is determined by the angle difference ratio of the two channels and the knowledge of the reverse function (tabulated for example) of the ratio of the reception gains.

When there is a piece of information on a presence of a blade flash in only a channel, it means that the blade flash has reached an external edge of the multilobe. The relative bearing of the helicopter is then given by the direction of the reception lobe having given rise to the detection at this instant.

After the relative bearing computation circuit 100, there is a tracking device using discontinuous information. This tracking device associates, with the relative bearing values computed for the different blade flashes detected, a piece of information on quality and an angular window related to this piece of information on quality which depends on whether or not there is a possibility of an angle measurement and on the signal-to-noise ratio. This piece of information on quality and these angular windows enable comparisons to be made between the various bearing values obtained for the blade flashes, either from one antenna rotation to another antenna rotation to distinguish the blade flashes coming from one and the same helicopter, and to refine the precision with which this helicopter is identified by choosing the relative bearing value associated with the most precise piece of information on quality and the narrowest angular window, or within one antenna rotation itself to distinguish possibly two helicopters that are in the same distance window and in the aperture of the beam.

What is claimed is:

1. A Doppler radar for the detection and localization of helicopters blade flash echoes, generating at least two interrogation pulses in the duration of a blade flash during the time taken by the transmission antenna lobe to pass through a given direction, having an ambiguous Doppler speed of the order of 450 m/s and comprising:

wideband Doppler filtering means matched with a wide spectrum of the blade flashes, including at least one cell comprising two identical parts operating in parallel, a first part operating on an in-phase component of the instantaneous echo signal for a given distance window and another part operating on a quadrature component of said instantaneous echo signal for a given distance window, each said part comprising a subtractor receiving, at its two inputs, the corresponding component in phase or in quadrature of said instantaneous echo signal for a given distance window, directly at one of its inputs, and by means of a delay circuit at its other input, said delay circuit introducing a delay of two periods of recurrence of the interrogation pulse; and means for selecting the echoes as a function of their duration, said means for selecting operating on a module of the signal having its components in phase and in quadrature delivered by said wideband Doppler filtering means, including means for eliminating excessively long echoes, said means eliminating echoes with a duration that corresponds to the time taken for the transmission antenna lobe of the antenna to pass through a fixed direction, and means for eliminating excessively short echoes with a duration that does not go beyond a period of recurrence of the interrogation pulse.

2. A radar according to claim 1 wherein said wideband Doppler filtering means includes two identical cells which are cascaded, each said cell comprising two identical parts operating in parallel, the one on the in phase component of the instantaneous echo signal for a given distance window and the other on the quadrature component of said instantaneous echo signal for a given distance window, each part comprising a subtractor receiving, at its two inputs, the corresponding component in phase or quadrature of said instantaneous echo signal for a given distance window, directly at one of its inputs, and by means of a delay circuit at its other input, said delay circuit introducing a delay of two periods of recurrence of the interrogation pulse.

3. A radar according to claim 1, comprising at least two reception channels, antenna patterns of which are offset in relative bearing and partially overlapping, and a relative bearing computation circuit performing an angle measurement on the basis of the in-phase and quadrature components of the instantaneous echo signals on the two reception channels when they occur simultaneously, wherein said radar further comprises a device for tracking based on discontinuous information, said device associating, with the directions of the detected targets, angular correlation window widths and information on detection quality, for improving target designation precision on the basis of different intercepted blade flashes corresponding to one and the same helicopter.

* * * * *